United States Patent [19]

Ukawa et al.

[11] Patent Number: 5,034,028
[45] Date of Patent: Jul. 23, 1991

[54] EXHAUST GAS TREATING METHOD

[75] Inventors: Naohiko Ukawa; Susumu Okino, both of Hiroshima; Taku Shimizu; Kouichiro Iwashita, both of Tokyo, all of Japan

[73] Assignee: Mitsubishi Jukogyo Kabushiki Kaisha, Tokyo, Japan

[21] Appl. No.: 445,399

[22] Filed: Dec. 4, 1989

[30] Foreign Application Priority Data

Dec. 2, 1988 [JP] Japan ............... 63-304006

[51] Int. Cl.⁵ .................................... B01D 53/14
[52] U.S. Cl. ........................................ 55/73; 423/242
[58] Field of Search ........................... 55/73; 423/242

[56] References Cited

U.S. PATENT DOCUMENTS

| Re. 29,813 | 10/1978 | Yamamichi et al. ............ 423/242 |
| 4,293,521 | 10/1981 | Isahaya et al. .................. 423/242 X |
| 4,297,332 | 10/1981 | Tatani et al. ................... 55/73 X |
| 4,792,440 | 12/1988 | Nielsen et al. ................ 423/242 X |
| 4,836,991 | 6/1989 | Ishiguro et al. ................ 423/242 |
| 4,853,195 | 8/1989 | Lehto ............................ 423/242 |
| 4,900,524 | 2/1990 | Füllemann ..................... 423/242 |
| 4,911,901 | 3/1990 | Ogawa et al. .................. 423/242 |

FOREIGN PATENT DOCUMENTS

| 0239345 | 9/1986 | German Democratic Rep. ...................... 423/242 |
| 55-167023 | 12/1980 | Japan . |
| 60-122029 | 6/1985 | Japan . |
| 61-178021 | 8/1986 | Japan . |
| 61-178025 | 8/1986 | Japan . |
| 61-167922 | 10/1986 | Japan . |
| 62-140624 | 6/1987 | Japan . |
| 62-170128 | 10/1987 | Japan . |
| 63-104634 | 5/1988 | Japan ......................... 423/242 |
| 2138793 | 10/1984 | United Kingdom ............. 423/242 |

Primary Examiner—Robert Spitzer
Attorney, Agent, or Firm—Toren, McGeady & Associates

[57] ABSTRACT

A method of treating an exhaust gas containing $SO_2$ and HF which is characterized by using an absorbing liquid containing $CaCO_3$ and $Ca(OH)_2$ as absorbents to be fed to an absorption tower for the exhaust gas, circulating the absorbing liquid from a second slurry tank to the absorption tower, from the absorption tower to a first slurry tank, and from the first flurry tank to the second slurry tank, introducing $Ca(OH)_2$ into the second slurry tank to keep the pH value of the absorbing liquid in the second slurry tank in the range of 5.5–7.0, and blowing air into the absorbing liquid in the first slurry tank.

2 Claims, 2 Drawing Sheets

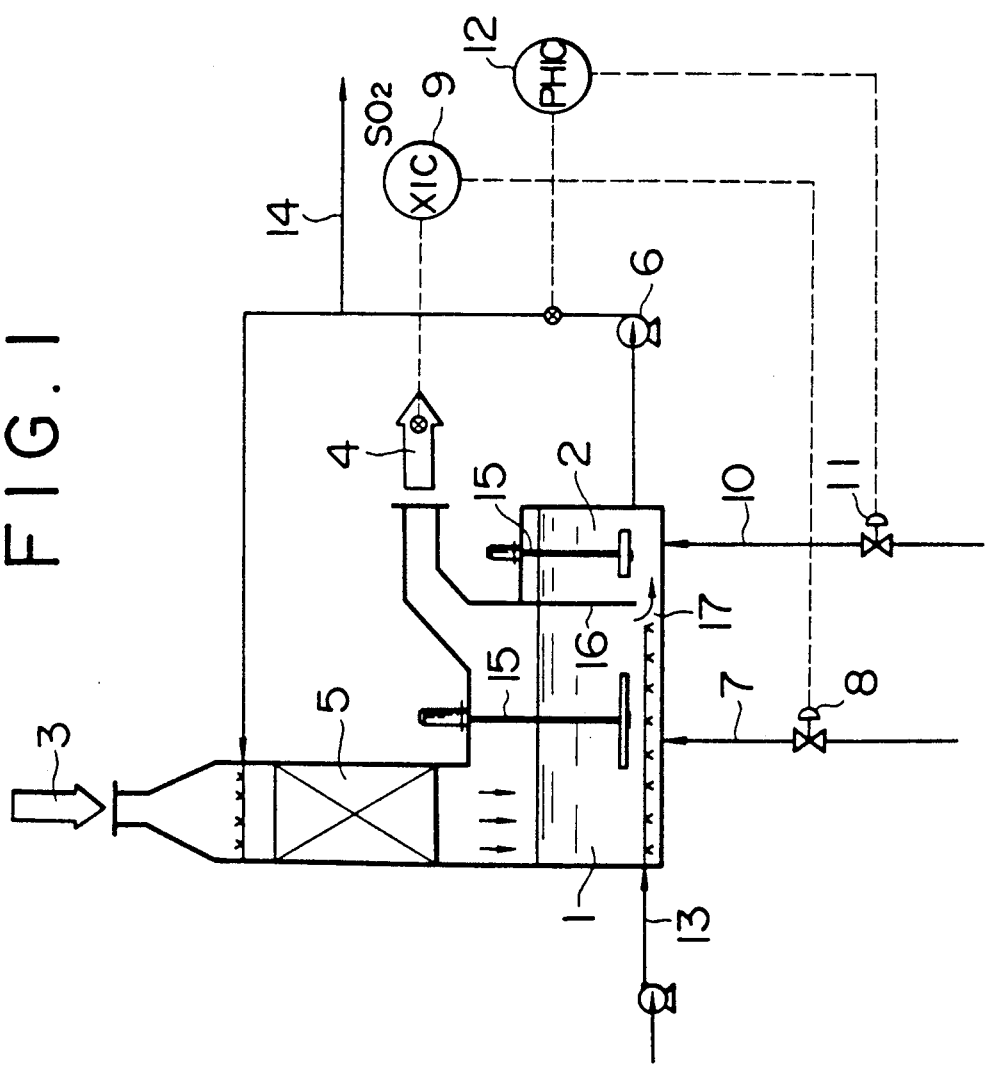

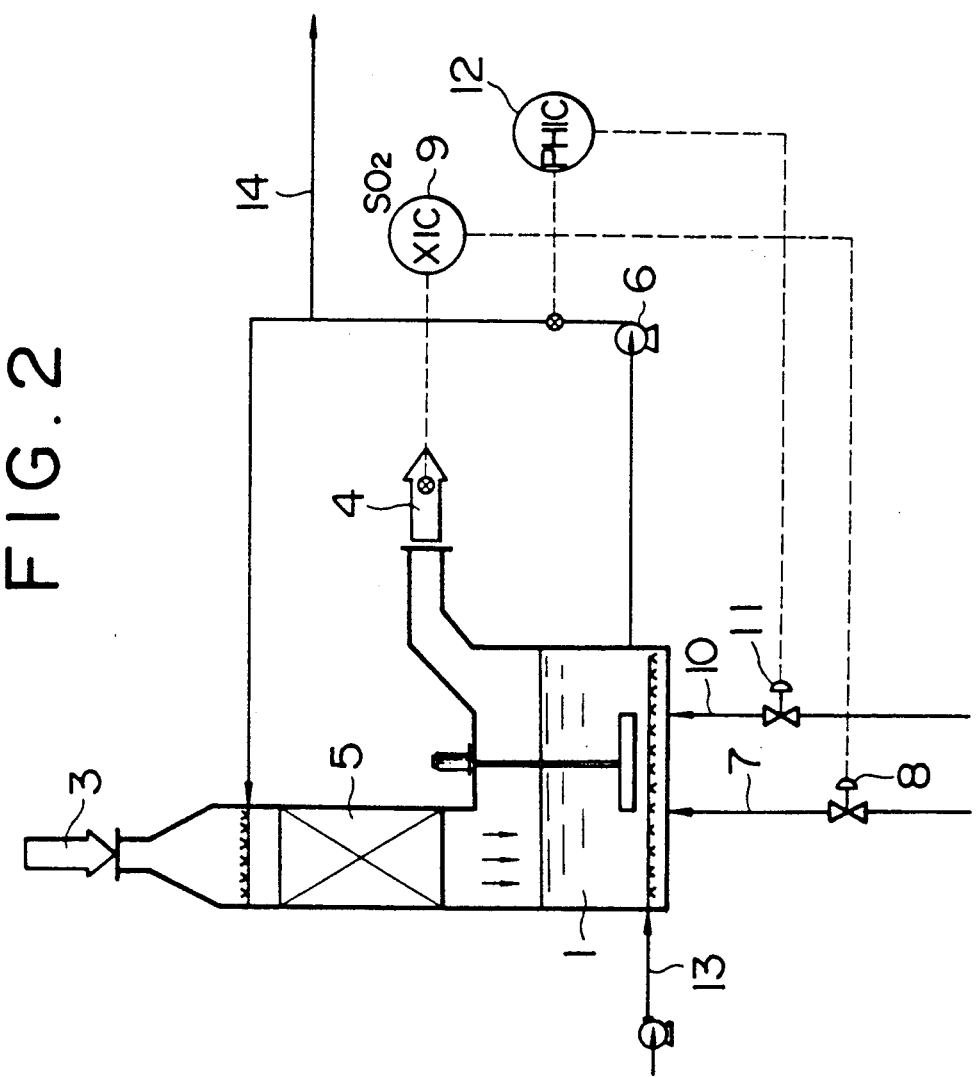

1

EXHAUST GAS TREATING METHOD

FIELD OF THE INVENTION AND RELATED ART STATEMENT

The present invention relates to a method for treating an exhaust gas and more particularly to a wet type method for treating an exhaust gas containing $SO_2$ and HF, such as an exhaust gas from the combustion of coal.

When known exhaust gas desulfurization according to a wet type lime process is carried out, the resulting exhaust gas may contain not only $SO_x$ but also HF as harmful components. For example, the exhaust gas from the combustion of coal includes about 1,000 ppm of $SO_x$ and about 40 ppm of HF.

Such exhaust gas is treated in a wet type exhaust gas treating tower using $CaCO_3$ as an $SO_2$-absorbing agent to bring about the following reactions:

$$CaCO_3 + SO_3 \rightarrow CaSO_3 + CO_2 \quad (1)$$

$$CaCO_3 + 2HF \rightarrow CaF_2 + CO_2 + H_2O \quad (2)$$

When the exhaust gas includes a large amount of dust, the dust contains Al as a component which dissolves and reacts with HF to produce a fluoride of Al (which is referred to as $AlF_x$ hereinafter). It is known that this $AlF_x$ prevents limestone ($CaCO_3$) from dissolving, as discussed in Japanese Patent Provisional Publication No. 167023/1980. However, the addition of a basic sodium salt can prevent the above disadvantage, as described also in the above-mentioned publication.

Accordingly, by adding a basic sodium salt in an amount which depends on that of HF to treat an exhaust gas containing $SO_2$ and HF, a method having no disadvantage due to $AlF_x$ should be achieved. In this regard, however, the thus added sodium remains in an absorbent liquid, and a decrease in the amount of waste water therefore causes an increase in the concentration of sodium in the absorbent liquid. Accordingly, when $SO_2$ is recovered in the form of gypsum, the purity of the recovered gypsum tends to be lowered by the coexisting sodium.

Also, Japanese Patent Provisional Publication No. 122029/1985 discloses another method having no disadvantage due to $AlF_x$ by adding in a pulse-like manner an alkali compound to the absorbing liquid in order to temporarily increase the pH value thereof. It is to be noted that this method may result in lower desulfurization efficiency which lasts, though only for a short period of time, between the lowering and recovery of the desulfurization efficiency.

OBJECT AND SUMMARY OF THE INVENTION

An object of the present invention is to provide a method for treating an exhaust gas which overcomes the disadvantage concerning the obstacle of insolubility of $CaCO_3$ due to $AlF_x$ and in which gypsum can be recovered in a highly pure form.

The gist of the present invention resides in a method for treating an exhaust gas containing $SO_2$ and HF, characterized by using an absorbing liquid containing $CaCO_3$ and $Ca(OH)_2$ as absorbents to be fed into an absorption tower for the exhaust gas; circulating the absorbing liquid from a second slurry tank to the absorption tower, from the absorption tower to a first slurry tank, and from said first slurry tank to said second slurry tank; and introducing $Ca(OH)_2$ into said second slurry tank to keep the absorbing liquid in said second slurry tank at a pH value of 5.5–7.0 while blowing the air into the absorbing liquid in said first slurry tank.

The present invention can eliminate the harmful influence of HF and dust included in the exhaust gas, maintain the activity of $CaCO_3$, decrease the amount of the expensive $Ca(OH)_2$ to be used, and recover gypsum in a highly pure form.

BRIEF DESCRIPTION OF THE DRAWINGS

FIG. 1 is a flow chart showing an Example of the present invention.

FIG. 2 is a flow chart showing Comparative Example 2.

DETAILED DESCRIPTION OF PREFERRED EMBODIMENTS

As described above, in the present invention an absorbing liquid including $CaCO_3$ and $Ca(OH)_2$ as absorbents is used, $Ca(OH)_2$ is added to the absorbing liquid in a second slurry tank to be introduced to an absorption tower for exhaust gases to control the absorbing liquid at a pH value of 5.5–7.0, the air for oxidation is blown into the absorbing liquid in a first slurry tank into which the absorbing liquid from the absorption tower is introduced, and the absorbing liquid is circulated from the second slurry tank to the first slurry tank through the absorption tower.

In addition to the above basic sodium salts, a variety of alkali compounds have been proposed to decompose $AlF_x$. This is because Al, which is a component of $AlF_x$, is transferred to the solid phase by alkali. The inventors of the present invention have further investigated the effect of these alkali additives to find that these compounds are equal as to the effect of decomposing $AlF_x$, but a considerable amount of F is left in the absorbing liquid when Na and Mg are used as a source of alkali, and even when $AlF_x$ is decomposed once by alkali $AlF_x$ easily reappears in the dissolved form if the pH value becomes low. It is presumed that this is because the use of Na and Mg salts brings about the production of relatively soluble compounds such as NaF and $MgF_2$. On the other hand, the use of $Ca(OH)_2$ lowers the concentration of F in the absorbing liquid because F also deposits in the solid phase as a relatively insoluble $CaF_2$ together with Al. As a result, the amount of F which appears again in the absorbing liquid is greatly reduced. This is the reason that the absorbing liquid containing $CaCO_3$ and $Ca(OH)_2$ as absorbents is used in the present invention.

Moreover, the inventors have studied the way of supplying $CaCO_3$ and $Ca(OH)_2$, and found that the effect of said $Ca(OH)_2$ is remarkable when two slurry tanks are used for holding the absorbing liquid to be fed into the absorption tower for the exhaust gas; the absorbing liquid is circulated from the second slurry tank to the absorption tower, from said absorbing tower to the first slurry tank, and from said first slurry tank to said second slurry tank; the air is blown into the absorbing liquid in said first slurry tank for oxidation; and $Ca(OH)_2$ is added to the absorbing liquid in said second slurry tank to adjust its pH value in the range from 5.5 to 7.0.

That is to say, as the inventors found, even when $Ca(OH)_2$ is added to the second slurry tank, $AlF_x$ is not sufficiently decomposed by $Ca(OH)_2$ at a pH value of less than 5.5, and the reactivity of $CaCO_3$ cannot therefore be fully recovered. On the other hand, it was found that even when the amounts of the sources of $AlF_x$ (e.g., fly ash and HF) included in an exhaust gas are changed, the reactivity of stable $CaCO_3$ can be kept by controlling the pH value of the absorbing liquid in the second slurry tank in the range of 5.5-7.0.

When the pH value of the absorbing liquid in the second slurry tank is over 7, the oxidation rate of sulfite becomes low to produce calcium sulfite, and gypsum cannot be recovered with high purity.

When $Ca(OH)_2$ is fed to the first slurry tank, the amount of $Ca(OH)_2$ is more than that fed to the second slurry tank. It was found that $Ca(OH)_2$ is consumed in neutralization reactions because the reaction rate of $Ca(OH)_2$ is higher than that of $CaCO_3$.

Namely, it was found that when fed to the second slurry tank the amount of $Ca(OH)_2$ required to recover the reactivity of $CaCO_3$ after the decomposition of $AlF_x$ is minimized.

Thus, in the present invention $Ca(OH)_2$ is introduced into the second slurry tank and the absorbing liquid in said second slurry tank is kept at a pH value of 5.5-7.0.

Also, in said first slurry tank, calcium sulfite is oxidized to gypsum by means of blowing the air into the absorbing liquid.

It is to be noted that the effect of $Ca(OH)_2$ is not different when added to either the first slurry tank or the second slurry tank.

As described above, the present invention can exclude the harmful influence of HF and dust in exhaust gases, maintain the activity of $CaCO_3$, decrease the amount of expensive $Ca(OH)_2$ to be used and recover highly pure gypsum.

EXAMPLE

An example of the present invention will be explained with reference to FIG. 1.

First, 200 $m^3N/h$ of exhaust gas taken out of a small pulverized coal burner (which is not shown in FIG. 1) was treated according to the method for treating an exhaust gas shown in the flow chart in FIG. 1. The inlet temperature of the treated exhaust gas was kept at 110° C. by a heatexchanger (which is not shown in FIG. 1), and the dust concentration was adjusted at about 200 $mg/m^3N$ by a bag filter (which is not shown in FIG. 1).

The inlet concentrations of $SO_2$ and HF were 1,200 ppm and 53 ppm, respectively.

The exhaust gas to be treated was introduced into an absorption tower 5 by line 3 and discharged from a line 4 after the removal of $SO_2$ and HF therefrom. Under the absorption tower 5 were placed a slurry tank 1 (which is called the first slurry tank) and a slurry tank 2 (which is called the second slurry tank) both holding an absorbing liquid. The absorbing liquid was sent from the slurry tank 2 to the absorbing tower 5 by means of an absorbing liquid pump 6, sent from the absorbing tower 5 to the slurry tank 1 and then recycled from the slurry tank 1 to the slurry tank 2.

Slurry of $CaCO_3$ was fed to the slurry tank 1 by line 7. In this case, the amount of $CaCO_3$ slurry fed was automatically adjusted by a control valve 8 through a controller 9 to obtain a $SO_2$ concentration of 50 ppm in the gas in line 4 discharged from the absorption tower.

On the other hand, slurry of $Ca(OH)_2$ was fed into the slurry tank 2 by line 10. The flow rate of $Ca(OH)_2$ slurry was automatically adjusted by a control valve 11 through a pH controller 12 to obtain a pH value of 5.7 in the absorbing liquid sent from the slurry tank 2 to the absorbing tower 5.

Also, a given amount of the air for oxidation was introduced into the slurry tank 1 by line 13.

A part of the absorbing liquid to be fed to the absorbing tower 5 by means of the absorbing liquid pump 6 was taken out by line 14.

It is to be noted that 15 is a stirrer, 16 is a barrier placed between the slurry tank 1 and the slurry tank 2, and 17 is a passage placed between the barrier and the tank bottom.

Under the above-mentioned conditions, a stationary run was carried out in which $SO_2$ in the outlet gas was stable at 50 ppm and the pH value of the absorbing liquid in the slurry tank 1 was 5.2.

Also, the $CaCO_3$ concentration in the absorbing liquid was 0.04 mol/liter, the reactivity of $CaCO_3$ was good and no calcium sulfite was recognized.

The concentrations of Al and F in the filtrate of the absorbing liquid were determined to find trace amounts of 1.3 mg/liter and 17 mg/liter, respectively.

The molar ratio of $CaCO_3$ to $Ca(OH)_2$ introduced in the Example of the present invention was $$Ca(OH)_2/[CaCO_3 + Ca(OH)_2] = 0.025.$$

COMPARATIVE EXAMPLE 1

A run was carried out with the same equipment under the same conditions as given in the above Example of the present invention except for using only $CaCO_3$ as the absorbent. That is, in FIG. 1, the $Ca(OH)_2$ slurry was not fed from line 10.

In Comparative Example 1, the pH values of the absorbing liquids in the slurry tanks 1 and 2 became gradually lower, after starting the run, to 4.5 and 4.8, respectively, toward the final stage.

The concentration of $CaCO_3$ in the absorbing liquid was 0.11 mol/liter and the reactivity of $CaCO_3$ was exceedingly lower in comparison with the above Example of the present invention. The concentrations of Al and F in the filtrate of the absorbing liquid were 75 mg/liter and 120 mg/liter, respectively.

COMPARATIVE EXAMPLE 2

In comparative Example 2, a run was carried out with the equipment shown in FIG. 2 under the same gas conditions as given in the above Example of the present invention. It is to be noted that the numerical figures and signs given in FIG. 2 indicate the same parts as given in FIG. 1, except that FIG. 2 has only one slurry tank holding the absorbing liquid to be fed to the absorbing tower 5. In Comparative Example 2, the $CaCO_3$ slurry and the $Ca(OH)_2$ slurry were introduced into the slurry tank 1 at the same time.

Under the above-mentioned conditions, a run was carried out so that the $SO_2$ concentration in the outlet could be kept at a constant value of 50 ppm.

The concentration of $CaCO_3$ in the absorbing liquid was 0.04 mol/liter, and the reactivity of $CaCO_3$ was good. In Comparative Example 2, the mol ratio of $Ca(OH)_2$ to $CaCO_3$ fed was $Ca(OH)_2/[CaCO_3 + Ca(OH)_2] = 0.12$. This revealed that the amount of $Ca(OH)_2$ used in Comparative Example 2 was much more than that in the above Example of the present invention. The concentrations of Al and F in the absorbing liquid in Comparative Example 2 were 1.5 mg/liter and 20 mg/liter, respectively.

As explained above, the present invention can provide a superior method for treating an exhaust gas which eliminates the harmful influence of HF and dust in exhaust gases, maintains the activity of $CaCO_3$, decreases the amount of the expensive $Ca(OH)_2$ to be used and recovers gypsum in a highly pure form.

The technical scope of the present invention is not limited by the above-described Example. Any modifications derived from the Claims given below are to be included in the present invention.

We claim:

1. A method for treating an exhaust gas containing $SO_2$ and HF, comprising the steps of:

providing an exhaust gas absorption tower and a slurry tank with first and a second slurry tank sections which are disposed under said tower;

using an absorbing liquid containing $CaCO_3$ and $Ca(OH)_2$ as absorbents to be fed to the gas absorption tower;

circulating said absorbing liquid from a liquid contact portion of the absorption tower to the first slurry tank section, from the first slurry tank section to the second slurry tank section, and from the second slurry tank section to the top of the absorption tower;

introducing $Ca(OH)_2$ to only the second slurry tank section to keep the pH value of the absorbing liquid in the second slurry tank section in the range of 5.5–7.0; and blowing air into the absorbing liquid in the first slurry tank section.

2. A method for treating an exhaust gas containing $SO_2$ and HF, as claimed in claim (1), and further comprising the step of introducing $CaCO_3$ into the first slurry tank section.

* * * * *